United States Patent [19]

Weirauch

[11] Patent Number: 4,911,905

[45] Date of Patent: Mar. 27, 1990

[54] METHOD OF FORMING STOICHIOMETRIC II-VI COMPOUNDS OF HIGH PURITY

[75] Inventor: Donald F. Weirauch, Dallas, Tex.

[73] Assignee: Texas Instruments Incorporated, Dallas, Tex.

[21] Appl. No.: 315,077

[22] Filed: Feb. 24, 1989

Related U.S. Application Data

[63] Continuation-in-part of Ser. No. 253,897, Oct. 3, 1988, abandoned, which is a continuation of Ser. No. 185,234, Apr. 18, 1988, abandoned, which is a continuation of Ser. No. 31,156, Mar. 25, 1987, abandoned, which is a continuation of Ser. No. 900,962, Aug. 28, 1986, abandoned, which is a continuation-in-part of Ser. No. 654,445, Sep. 25, 1984, abandoned.

[51] Int. Cl.$^4$ .............................................. C01B 19/04
[52] U.S. Cl. ......................................... 423/509; 75/71; 252/62.3 ZT; 423/508; 423/510
[58] Field of Search ................... 423/508, 509, 510; 75/71; 256/62.3 V, 62.3 ZT

[56] References Cited

U.S. PATENT DOCUMENTS 1,963,546  6/1934  Depew ................................ 423/509
4,401,463  8/1983  Melin et al. ........................... 75/71

FOREIGN PATENT DOCUMENTS 138056  3/1960  U.S.S.R. .................................. 75/71

OTHER PUBLICATIONS

Kogtev et al., "Inorg. Mat.", vol. 14, No. 1, 1/78, pp. 30-32.

*Primary Examiner*—Jack Cooper
*Attorney, Agent, or Firm*—Melvin Sharp; James T. Comfort; Carl H. Hoel

[57] ABSTRACT

The disclosure relates to a method of purifying cadmium and tellurium and forming pure, stoichiometric cadmium telluride therefrom as well as the apparatus for making such cadmium telluride. The cadmium and tellurium are purified by heating each separately to volatilization and passing water in a reducing gas through the volatilized cadmium and tellurium to react with impurities and form gases or precipitates. The cadmium and tellurium are volatilized at different predetermined temperatures such that the amount of each volatilized will be the same so that reaction later takes place with stoichiometric amounts of the elements to form the cadmium telluride. The cadmium telluride is then condensed at low enough temperature so that the remaining gases pass out of the system.

4 Claims, 1 Drawing Sheet

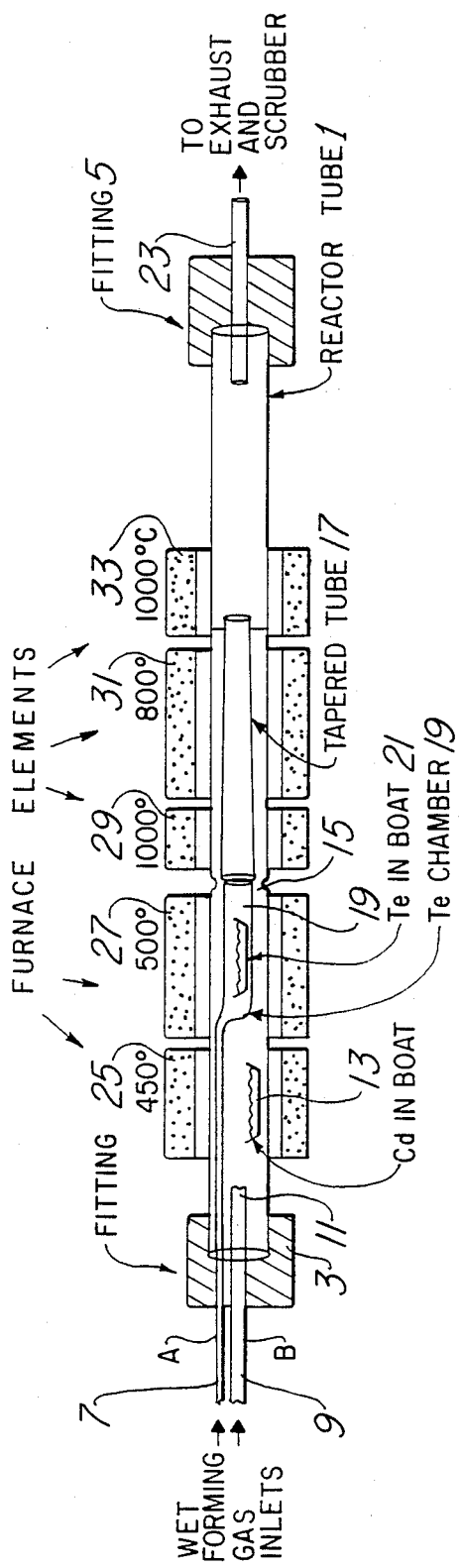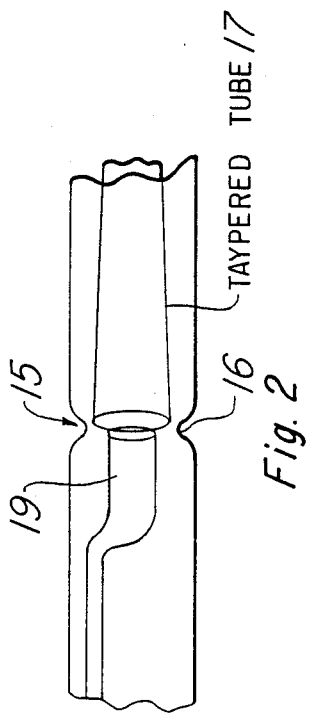

METHOD OF FORMING STOICHIOMETRIC II-VI COMPOUNDS OF HIGH PURITY

CROSS-REFERENCE TO RELATED APPLICATIONS

This application is a continuation-in-part of copending Ser. No. 253,897 filed 10/3/88, which is a continuation of Ser. No. 185,234, filed 4/18/88, which is a continuation of Ser. No. 031,156, filed 3/25/87, which is a continuation of Ser. No. 900,962, filed 8/28/86, which is a continuation-in-part of Ser. No. 654,445, filed 9/25/84, all now abandoned.

FIELD OF THE INVENTION

This invention relates to a method of purifying cadmium and tellurium and to a method of combining the purified cadmium and tellurium to form stoichiometric cadmium telluride.

BRIEF DESCRIPTION OF THE PRIOR ART

In the growth of mercury cadmium telluride liquid phase epitaxial films on cadmium telluride substrates, it is essential that the cadmium telluride be of the highest possible purity so that impurities from the cadmium telluride substrate do not change the electrical properties of the mercury cadmium telluride film. Also, in the growth of cadmium telluride crystals for use as substrates, it is extremely desirable that the starting cadmium telluride material be as close to stoichiometry as can be achieved. While such materials are presently available, they are extremely expensive due to the very high cost of relatively pure cadmium and tellurium. One reason for this high cost appears to be that, in the formation of cadmium telluride, the cadmium telluride crystals which are formed stick to the amorphous quartz boat or holder and it is then difficult to remove the crystals from the boat for later use. This problem of sticking to the quartz boat is caused by the impurities present in the cadmium telluride and, apparently, primarily by the cadmium oxides existing therein. On the other hand, there are some methods whereby pure single crystal stoichiometric cadmium telluride can be formed, however these methods are not susceptible to commercial scale production of such materials. In accordance with one such method, cadmium and tellurium are placed at the bottom of an ampoule, the ampoule then being evacuated and sealed and the cadmium and tellurium then being melted to form cadmium telluride. In this procedure there is a problem of sticking to the amorphous quartz ampoule. In accordance with another method, a quartz tube is provided with a plurality of quartz rings spaced apart therein and with cadmium placed at the bottom portion of the tube beneath the bottom-most ring and tellurium placed in the tube downstream of the second quartz ring. The tube is evacuated and then a heater is placed opposite the cadmium to cause the cadmium to evaporate and move into the region between the first and second ring, this being done at a temperature in the range of 400 to 500 degrees C. The cadmium residue has been analyzed and found to be cadmium oxide. The heater is then moved between the first and second rings and causes the cadmium to move further downstream of the second ring and contact the tellurium. The furnace is then moved up beyond the second ring and causes the tellurium and cadmium to combine to form cadmium telluride. The cadmium telluride does not stick to the quartz tube and therefore it is clear that the end product is pure. However, as stated above, this procedure does not lend itself to commercial production of cadmium telluride which is of high purity, single crystal and stoichiometric in nature.

SUMMARY OF THE INVENTION

In accordance with the present invention, there is provided a method of purifying cadmium and tellurium constituents and reacting these purified constituents to form stoichiometric cadmium telluride which is composed of small single crystals and is of consistent composition. The method makes use of thermodynamic calculations which show that advantages chemical purification for certain elements such as carbon and sulphur can be realized by exposing cadmium, tellurium or cadmium telluride to a reducing atmosphere containing water vapor. Such atmosphere can be hydrogen or forming gas (10% $H_2$, 90% $N_2$) as examples. The purification of these elements occurs because, at elevated temperatures, they react with water to form hydrogen and a gas, e.g., $C+H_2O \rightarrow H_2+CO$. The water does not react with cadmium, tellurium or cadmium telluride if the gas is reducing in nature.

The method further makes use of the purification which occurs during a distillation operation. This technique utilizes differences in vapor pressure of elements. If, for example, cadmium or tellurium are raised to suitable temperatures, they will evaporate at appreciable rates. Impurities with high vapor pressures will also evaporate rapidly whereas materials with low vapor pressures will show extremely slow evaporation.

Briefly, in accordance with the present invention, impure cadmium is placed in a boat in a first chamber and impure tellurium is placed in a boat in a second chamber, both the boat and the chamber preferably being formed of vitreous silica or high purity aluminum oxide, with each chamber having an exit into a common region. The chamber containing the cadmium is heated to a temperature to provide evaporation of the cadmium to provide some predetermined vapor pressure at the temperature in the chamber and the chamber containing the tellurium is raised to a temperature so that the tellurium will evaporate at the same vapor pressure as that of the cadmium to provide, at the common output of the two chambers, an essentially stoichiometric amount of cadmium and tellurium. During this procedure, wet forming gas or hydrogen in a reducing atmosphere is passed through each of the two chambers to react with the impurities, those impurities having a vapor pressure the same as or greater than the cadmium or tellurium being vaporized and passing out of the chamber exits along with the cadmium and tellurium, whereas those impurities having a vapor pressure lower than the cadmium or tellurium remaining in the boats in the chambers. The cadmium and tellurium react with each other upon combining at the exit of the two chambers in a further tapered chamber in a first region thereof having an elevated temperature of about 1000 degrees C. or at a temperature which is sufficiently high so that the cadmium telluride formed at that location will remain in the vapor state. The gasses continue to flow through the tapered chamber to a second region where the furnace temperature is below that at which cadmium telluride will remain gaseous or about 800 degrees C. The cadmium telluride therefore solidifies and forms single crystals in this zone, whereas the other volatiles in the stream will continue toward the exhaust and scrubber of the system. A farther portion of the tapered chamber, at a higher temperature above the boiling point of the cadmium telluride, is positioned at the downstream end of the tapered chamber to confine the precipitated cadmium telluride to the second region. All volatiles that remain, as stated above, will continue to the exhaust and scrubber. Therefore, in the event there should be an excess of cadmium or tellurium at the exhaust of the first two chambers, such cadmium and/or tellurium can be recovered and recycled. In order to recover the purified single crystal stoichiometric cadmium telluride, the furnace is periodically shut down and the tapered chamber is removed with the cadmium telluride easily removed therefrom since there is no sticking thereof to the quartz walls of the chamber due to the purity thereof. It can be seen that in accordance with the present invention, there is provided a method and system whereby crystalline cadmium telluride is formed which is of high purity and stoichiometric in nature.

BRIEF DESCRIPTION OF THE DRAWINGS

FIG. 1 is a schematic diagram of a cadmium and tellurium purification system with cadmium telluride formation in accordance with the present invention; and FIG. 2 is an enlarged view of the encircled portion of FIG. 1 at outlet 15.

DESCRIPTION OF THE PREFERRED EMBODIMENT

Referring now to FIG. 1, there is shown a schematic diagram of a purification system for providing pure cadmium and tellurium in stoichiometric quantities to form crystalline cadmium telluride which is pure and of the proper stoichiometry. The system includes a reactor tube 1 which is preferably formed of vitreous quartz and which has a pair of fittings 3 and 5 at opposite ends thereof. The fittings 3 and 5 seal off the ends of the reactor tube 1 except for tubes 7, 9 and 23 passing therethrough which will now be explained.

The fitting 3 includes a pair of tubes 7 and 9 passing therethrough, the tube 9 passing to a first chamber 11 in which is disposed a vitreous quartz boat 13 having impure cadmium therein. The chamber 11 has an outlet 15 having a constriction 16 as shown in FIG. 2. A tapered ceramic tube 17 is disposed within tube 1, abuts the constriction 16 at its wide end and is adjacent the outlets of chambers 11 and 19 for reasons as will be explained hereinbelow. The inlet tube 7 passes to the chamber 19 within the reactor tube 1, the chamber 19 including a ceramic quartz boat 21 in which is disposed impure tellurium. The outlet of the chamber 19 passes to the inlet of the tapered tube 17 at which point the output gasses from the chambers 11 and 19 will mix. The tapered ceramic tube 17 passes for an extended distance within the reactor tube 1 as will be explained in more detail hereinbelow and then the reactor tube alone continues to the fitting 5 through which is disposed the outlet tube 23 to an exhaust system and scrubbers and other desirable output devices.

As can be seen, five furnace elements 25, 27, 29, 31 and 33 are disposed along the reactor tube 1, the first furnace element 25 being disposed around the chamber 11 containing the cadmium in the boat 13, the second element 27 being disposed about the chamber 19 and tellurium containing boat 19, the third element 29 being disposed for a small region along the inlet to the tapered tube 17 at the outlet of the chambers 11 and 19, the fourth element 31 being disposed about a major portion of the tapered tube 17 and a fifth element 33 being disposed about the downstream end portion of the tapered tube 17 and beyond and along the reactor tube 1. The purpose of the five furnace elements is, in the case of the element 25 over the cadmium containing boat 13 and the element 27 over the tellurium containing boat 21, to provide the proper vapor pressure in each chamber so that the same amounts of cadmium and tellurium will evaporate on a time basis for reaction externally to these chambers at the inlet to tapered tube 17. Preferable temperatures for these elements are 450 degrees C. for element 25 and 500 degrees C. for element 27, it being understood that these temperatures can be altered to provide proper stoichiometric amounts of the volatilized elements so long as the temperature is high enough to provide rapid volatilization. The element 29 is positioned at the outlet of the chambers 11 and 19 and is at a temperature designed to cause rapid reaction between the cadmium and tellurium to form cadmium telluride and also to maintain the cadmium telluride thus formed in the vapor state. A preferred temperature of 1000 degrees C. is utilized for the element 29. The heating element 31 is designed to provide a temperature within the tapered tube which is sufficiently low to cause condensation of the cadmium telluride within the tapered tube. Accordingly, the reacted cadmium telluride will condense in the tapered tube 17 in the region within the heating element 31. The heating element 33 is designed to be at a temperature so that cadmium telluride will not condense in that zone.

In actual operation, a mixture of water and a reducing agent such as hydrogen, forming gas (10% $H_2$, 90% $N_2$) or the like is passed through the tube 7 and 9 into the chambers 11 and 19. At the temperatures within the chambers 11 and 19, the cadmium and tellurium will volatilize and any gasses formed in these chambers, by existence themselves or by reaction of impurities with the water, which have a vapor pressure higher than the cadmium or tellurium, will also volatilize and pass out of these chambers. In this manner, compounds will be formed with hydrocarbons that may be present with carbon itself, with sulphur, and the like, as is readily apparent. These compounds, if volatilized, will enter the region of the tapered tube 17 along with the cadmium and tellurium beneath the heating element 29 where reaction between the cadmium and tellurium will take place to form cadmium telluride in vapor phase. These gasses will continue within the tapered tube until they reach the region within the heating element 31 at which point the cadmium telluride will condense on the tapered tube 17 and the remaining gasses as well as any unreacted cadmium and/or tellurium will continue through the system and pass out through the tube 23 and the fitting 5. At periodic points during the operation, the system is shut down, the tapered tube 17 is removed and the cadmium telluride thereon or therein is removed therefrom, this cadmium telluride being pure and therefore not sticking to the quartz tapered tube 17. Impurities havig a vapor pressure lower than the cadmium or tellurium will remain in the boats. The system is then set up for operation again and the cycle is repeated.

The following are examples of the quantities usable in the foregoing method with the presumptions of a reactor tube 1 diameter of 50 mm and 250 grams of impure cadmium in boat 13 and 250 grams of impure tellurium in boat 21:

(1) bubble forming gas at a flow of 25 cubic centimeters per minute through water at 30 degrees C. (so the wet forming gas is about 4% water) and direct the wet forming gas through tubes 7 and 9 into chambers 11 and 19.

(2) bubble forming gas at a flow of 150 cubic centimeters per minute through water at 50 degrees C. (so the wet forming gas is about 12% water) and direct the wet forming gas through tubes 7 and 9 into chambers 11 and 19.

Although very simple in construction and operation, as discussed above, the reactor performs a multitude of functions, these being the fact that the furnace elements heat the cadmium and tellurium to temperatures at which vaporization occurs at a desired rate, thereby providing purification thereof within the chambers 11 and 19. In addition, during vaporization of cadmium and tellurium, impurities with low vapor pressures are left in the boats 13 and 21. Furthermore, certain impurities such as hydrocarbons and sulphur are also volatilized with the cadmium and tellurium but they react with the water in the flowing gas to produce harmless gases which pass out of the system. Furthermore, the cadmium and tellurium flow to the tapered tube 17 where they are mixed for the first time in a zone at 1000 degrees C. where they react to form cadmium telluride which has a vapor pressure substantially lower than cadmium or tellurium at the same temperature, however, at 1000 degrees C. the cadmium telluride has little tendency to deposit, thus the initial end of the tapered tube remains clean. The cadmium telluride vapors move to the 800 degree zone which is low enough in temperature for condensation to occur. The condensation process consists of the growth of cadmium telluride crystals possessing nearly perfect stoichiometry. The 800 degrees C. temperature is too high for cadmium, tellurium or volatile impurities to condense and therefore they move down the tube. Accordingly, the cadmium telluride which grows in the tapered tube posseses exceptional purity and stoichiometry. The excess cadmium and/or tellurium and the impurities exit from the tube into the scrubber system which removes them from the carrier gas if desired. By proper control of zone temperatures, gas velocities and zone lengths, a high yield process can be obtained. Furthermore, after the cadmium telluride has been formed, the tapered tube can be removed from the reactor and the cadmium telluride released into a storage chamber.

While the system described is a relatively simple version, many modifications can obviously be made which will still use the principals described hereinabove. For example, the cadmium and tellurium can be placed in separate chambers connected with the reactor tube in a Y or T configuration. The process described also lends itself to automation where, by using appropriate interlock chambers, the cadmium and tellurium are maintained at desired levels in their boats. Therefore, when the systems would be opened only to remove the cadmium telluride but not to refill the cadmium and telluride boats, operation can continue on a continuous basis. Thus, it is apparent that the invention is not restricted to the design described.

Purification of the reactants occurs by several different mechanisms:

(1) Impurity elements possessing low vapor pressure at the preferred temperatures for the Cd and Te zones (e.g., Fe, Mn, Cu etc.) will remain behind during the sublimation of the contents of that zone. These impurity elements might form an oxide coating due to reaction with the $H_2O$ vapor but would still would remain in the boat.

(2) Other elements possessing higher vapor pressures (such as Al, Sb etc.) would react with the $H_2O$ to either form an oxide coating, or to convert completely to an oxide and thus remain behind in the boat.

(3) Other impurity elements such as S, and C would react with the $H_2O$ to form a stable gaseous species (e.g. CO, $CO_2$, $SO_2$) and would pass through the system.

(4) Almost all impurity elements with moderate vapor pressures (e.g. Pb, Sn etc.) would possess volatilization and/or segregation properties such that the final CdTe product would be much purer than the starting material.

Thus all four mechanisms together would assure a much purer final product than could be obtained by a simple direct chemical reaction between the starting ingredients. Depending upon the impurities present, one or more of the four mechanisms may not be invoked.

If desired, a third zone containing Zn could be attached to the system to permit the compounding of (Cd,Zn)Te which is a popular substrate material. The zinc furnace element would be set to 550 degrees C.; the impure cadmium would be heated to about 450 degrees C.; the impure tellurium would be heated to about 500 degrees C.; the cadmium zinc telluride would form at about 1000 degrees C. and be solidified at about 800 degrees C. The same four mechanisms of impurity control would again apply. Also, if doping is desired (e.g. with As), a separate zone could be attached to the system for this purpose. Of course, each zone attached to the system would have to be maintained at its proper temperature to create the desired concentration of the specie in the vapor phase, and consequently the proper composition of the final product.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A method of forming stoichiometric cadmium telluride, comprising the steps of:
   (a) providing first and second separated chambers, each of said chambers having an inlet and an outlet;
   (b) placing impure elemental cadmium in said first chamber and impure elemental tellurium in said second chamber;
   (c) heating said first chamber to a temperature to volatilize the cadmium and volatilizable impurity material therein with a predetermined vapor pressure in said first chamber and heating said second chamber to a temperature to volatilize the tellurium and volatilizable impurity material therein with substantially said predetermined vapor pressure in said second chamber, the vapor pressure of cadmium and tellurium in said first and second chambers, respectively being essentially the same;
   (d) passing water in a reducing ambient gas from the inlet to the outlet of each of said chambers whereby said water reacts with said volatilized impurity material in said impure cadmium and said impure tellurium to form hydrogen and a gas, said reducing ambient gas carrying volatilized cadmium, tellurium and gas formed in the reaction of water and the impurity material therewith;

(e) combining said water, reducing ambient gas and carried volatiles from said outlets to form cadmium telluride vapors and other vapors; and (f) solidifying said cadmium telluride to form stoichiometric cadmium telluride while exhausting said other vapors.

2. The method of claim 1 wherein said impurities are taken from the class consisting of sulfur and carbon.

3. The method of claim 1, wherein:

(a) said ambient gas is a mixture of about 10% hydrogen and about 90% nitrogen;

(b) said impure cadmium is heated to about 450 degrees C. and said impure tellurium is heated to about 500 degrees C.;

(c) said cadmium telluride vapors are formed at about 1000 degrees C.; and (d) said cadmium telluride is solidified at about 800 degrees C.

4. The method of claim 3 wherein said impurities are taken from the class consisting of sulfur and carbon.

* * * * *